US 6,665,392 B1

(12) United States Patent
Wellner et al.

(10) Patent No.: US 6,665,392 B1
(45) Date of Patent: Dec. 16, 2003

(54) ASSOCIATING DATA CONNECTIONS WITH CONFERENCE CALL TELEPHONE

(75) Inventors: Pierre D. Wellner, Middletown, NJ (US); Stephen T. Dacek, Rockville Centre, NY (US); Arthur A. Goikhman, Marlboro, NJ (US); Cary T. Torkelson, Allendale, NJ (US)

(73) Assignee: Spiderphone.com, Inc., Rockville Centre, NY (US)

( * ) Notice: Subject to any disclaimer, the term of this patent is extended or adjusted under 35 U.S.C. 154(b) by 697 days.

(21) Appl. No.: 09/610,566

(22) Filed: Jul. 3, 2000

Related U.S. Application Data
(60) Provisional application No. 60/132,572, filed on May 5, 1999.

(51) Int. Cl.[7] .............................. H04L 12/18; H04M 3/56
(52) U.S. Cl. ............. 379/204.01; 370/261; 379/205.01; 379/900; 379/903
(58) Field of Search ..................... 348/14.08, 14.09; 370/260, 261, 262; 379/202.01, 203.01, 204.01, 205.01, 206.01, 900, 903; 709/204

(56) References Cited

U.S. PATENT DOCUMENTS

| | | | |
|---|---|---|---|
| 4,796,293 A | 1/1989 | Blinken et al. | ........ 379/202.01 |
| 5,509,009 A | 4/1996 | Laycock et al. | ............ 370/259 |
| 5,623,490 A | 4/1997 | Richter et al. | ............... 370/263 |
| 5,636,218 A | 6/1997 | Ishikawa et al. | ............ 370/401 |
| 5,642,156 A | 6/1997 | Saiki | ........................ 348/14.09 |
| 5,915,091 A | 6/1999 | Ludwig et al. | ............. 709/204 |
| 5,916,302 A * | 6/1999 | Dunn et al. | .................. 709/204 |
| 6,035,027 A * | 3/2000 | Alleman | ................ 379/205.01 |
| 6,370,137 B1 * | 4/2002 | Lund | .......................... 370/352 |

* cited by examiner

Primary Examiner—Harry S. Hong
(74) Attorney, Agent, or Firm—Irwin Ostrott; Robert B. Ardis (57) ABSTRACT

A method operationally associates a participant's telephone connection to a conference call system with a data connection via the Internet world wide web from the participant's computer screen to the conference call system. The conference call system establishes voice connections between itself and multiple conference call participants. The method comprises the steps of (1) generating a unique temporary code when a data connection is established between the participant and the conference call system, (2) displaying the code over the data connection to the participant on that participant's computer screen, and (3) instructing the participant to enter the code over his telephone connection to the conference call system. Four respectively different scenarios based upon the same underlying method include web then dial-in, dial-in then web, dial-out then web, and web then dial-out.

9 Claims, 6 Drawing Sheets

ASSOCIATING DATA CONNECTIONS WITH CONFERENCE CALL TELEPHONE

CROSS REFERENCE TO RELATED APPLICATION

This application claims the benefit of Provisional Appln. 60/132,572 filed May 5, 1999.

This application is related to application Ser. No. 09/449,463, filed Nov. 27, 1999, having the title "Active Talker Display for Web-Based Control of Conference Calls," and the same inventors and assignee as the present application. It is also related to application Ser. No. 09/575,430, filed May 22, 2000, having the title "Choice of Guaranteed vs. Bumpable Conference Call Reservations," and the same inventors and assignee as the present application.

FIELD OF THE INVENTION

This invention relates generally to telecommunications conferencing and, more particularly, to telecommunications conferencing in which users' individual telephone lines are associated with the same users' personal computer screens.

BACKGROUND OF THE INVENTION

Conference call systems that integrate personal computers with telephones often need to establish an operational association between a user's computer screen and that user's telephone line. This association is required in order to give users authenticated control of their telephone lines from their computers, so they can initiate telephone operations such as hang-up, mute, and hold on their own lines without necessarily being able to initiate such operations on the lines of other participants. In addition, the association authenticates that the participant controlling the data connection also has access to the telephone connection.

Unlike computer-controlled telephone sets and LAN (Local Area Network) controlled PBXs (Private Branch Exchanges), some conference call systems implement Internet-based services that have no fixed operational associations with any particular telephone sets. In addition to being connected to the Internet, these conference call systems are connected to the public switched telephone network (PSTN) through standard interfaces to a carrier's switch. Although these systems do not have any pre-set operational associations with any particular telephone, they can dynamically establish connections with any telephone on the PSTN during the course of making or receiving telephone calls.

In the past, systems have typically solved the operational association problem by pre-registering each participant with a unique ID (identification). When participants dial in to the conference bridge, they must not only enter their conference codes but must also enter their unique personal IDs, using the same personal ID when connecting to the system from a computer over the data network. Unregistered participants cannot be identified. Drawbacks to this approach are that participants must be pre-registered to enjoy the full benefits of the user interface and must also remember their personal identification numbers.

SUMMARY OF THE INVENTION

This invention enables a conference call system to establish efficiently an operational association between a particular user's computer on a public data network (e.g., a web browser on the Internet world wide web) and that same user's telephone on the public switched telephone network (PSTN). Advantages over the prior art include the following:

1) Participants do not have to pre-register with the system in order to enjoy its full capabilities.
2) Participants do not have to remember a personal identification number from one conference to the next.
3) The conference host is allowed to broadcast e-mail with the same conference code to all participants, thus avoiding any need to send individual e-mail to each participant with a unique access code.

The problem of establishing an operational association between a user's web browser and telephone line may be classified into four sub-problems, depending upon two factors:

1) Does the user call the bridge (dial-in) or does the bridge call the user (dial-out)?
2) Does the user establish the web connection first or the telephone connection first?

This classification leads to the four scenarios:

1) Web then dial-in: First the users establish a connection to the conference service using a web browser, and then they use their telephone to dial in to the conference system.
2) Dial-in then web: First the users use their telephone to dial into the conference system, and then they connect to it later with their web browser.
3) Dial-out then web: First the users receive and answer a telephone call that was initiated by the conference system, and then they later establish a web connection to the conference system.
4) Web then dial-out: First the users establish a web connection to the conference system and then the conference system initiates a telephone call to the user's telephone.

In accordance with the invention, a participant's telephone connection to a conference call system is operationally associated with a data connection from that participant's computer screen to a conference call system which establishes voice connections between itself and multiple conference call participants by: (1) generating a unique temporary code when a data connection is established between the participant and said conference call system; (2) displaying the code over the data connection to the participant on that participant's computer screen; and (3) instructing the participant to enter the code over his telephone connection to the conference call system.

From one aspect of the invention, the temporary code is a PIN (personal identification number) code unique within an individual conference call.

From another aspect of the invention, the temporary code is a match code unique across all active conferences and valid only for a limited period of time.

From yet another aspect of the invention, the temporary code is a language password or phrase which may be spoken into the participant's telephone and recognized by the system using speech recognition technology.

For the web then dial-in scenario, in accordance with the invention, the operational association between the participant's telephone and data connections is accomplished by: (1) establishing a data connection between the participant's computer screen and the conference system; (2) receiving a conference access code from the participant for a specific conference call; (3) generating a PIN (personal identification number) code unique to the specific conference; (4) sending the PIN code over the participant's data connection to the participant's computer; (5) displaying dialing instructions on the participant's computer screen explaining to the participant how to enter the conference; (6) dialing into the conference call according to the displayed dialing instructions; (7) establishing an operational association between the participant's data and telephone connections; and (8) displaying a conference control web page specific to the participant and the participant's telephone connection.

For the dial-in then web scenario, in accordance with the invention, the operational association between the participant's telephone and data connections is accomplished by: (1) dialing the participant's telephone into the conference call using a designated telephone number and conference access code, the system allowing the participant's telephone line into the conference call with no associated data connection; (2) if no personal identification number (PIN) is entered, the system informing the participant with a voice prompt that he can use his computer to see more detailed information about the conference; (3) the system allowing the participant from the conference web site to use a computer mouse to click on a specific button in order to view the conference call; (4) after the participant clicks on a view button, the system generating a temporary match code unique across all conferences for a limited period of time and displaying instructions to the participant on how to use this match code; and (5) after the participant enters the match code on his telephone line within the limited period of time, then making an operational association between the participant's data connection and the participant's telephone connection and displaying a conference control web page.

For the dial-out then web scenario, in accordance with the invention, the operational association between the participant's telephone and data connections is accomplished by: (1) entering a telephone number into the system and commanding the conference call system to dial out to the participant's telephone; (2) instructing the participant from the conference web site to click on a specific button in order to view the conference call; (3) generating a temporary match code unique across all conferences for a limited period of time and displaying instructions over the participant's data connection on how to use the match code; and (4) after the participant enters the match code on his telephone line in time, then making an operational association between the participant's data connection and the participant's telephone connection and displaying a conference control web page.

For the web then dial-out scenario, in accordance with the invention, the operational association between the participant's telephone and data connections is accomplished by: (1) establishing a data connection between the participant's computer and the conference call system; (2) entering a conference access code to authenticate the participant with the system and to identify which conference call the participant is attempting to join; (3) entering the participant's own telephone number and commanding the conference call to dial out to his telephone immediately or, if the conference is not scheduled to start yet, commanding the system to dial out to this telephone number at the appropriate time after at least one other person has joined the conference; (4) after the participant answers his telephone and confirms that he wishes to enter the conference, operationally associating the participant's data connection with the telephone connection the participant initiated; and (5) showing the participant his conference control web page.

The invention may be more fully understood from the following detailed description, taken in the light of the accompanying drawings and the appended claims.

DETAILED DESCRIPTION

Figure 1:
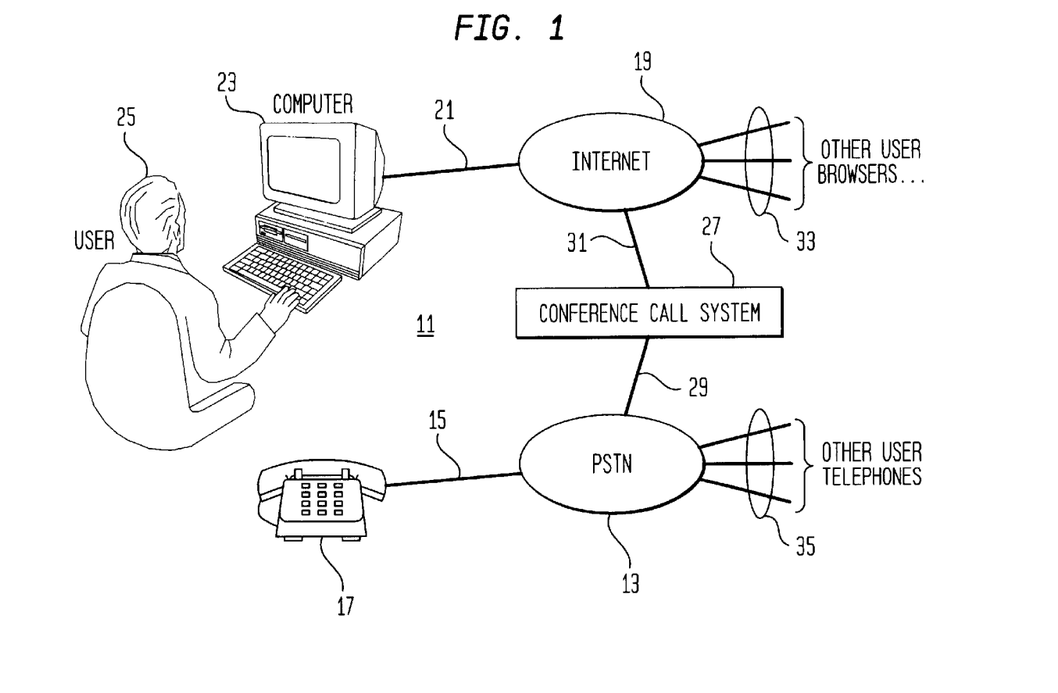
FIG. 1 is a block diagram of an arrangement operationally associating data connections with conference call telephone connections in accordance with the invention.

In FIG. 1, a typical arrangement 11 in which the invention may be practiced includes the public switched telephone network (PSTN) 13, a telephone access line 15 connecting a user telephone set 17 to PSTN 13, the Internet 19, and a telephone access line 21 connecting a user's personal computer (PC) 23 to Internet 19. A user 25 is shown operationally associated with both telephone set 17 and personal computer 23. A conference call system 27 operated by a service provider is connected by a telephone trunk 29 to PSTN 13 and by a telephone trunk 31 to the Internet. Other telephone access lines 33 connect the Internet 19 to other user browsers, and other telephone access lines 35 connect the PSTN 13 to respective other user telephones.

Figure 2:
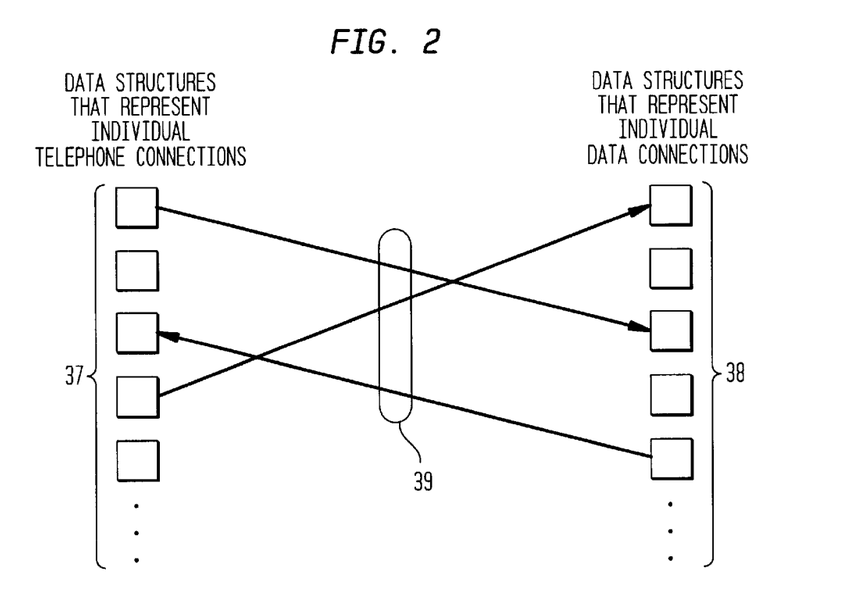
FIG. 2 is a block diagram of data structures representing individual telephone and data connections of the arrangement illustrated in FIG. 1, along with arrows illustrating how data structures representing telephone connections may be associated operationally with data structures representing data connections.

As shown in FIG. 2, conference call system 27 in FIG. 1 maintains (in memory and on disk) a plurality of data structures 37, each representing a respective telephone connection 15 and having a unique identifier, a plurality of data structures 38, each representing a respective data connection 21 and having a unique identifier. An operational association, represented by each of a plurality of arrows 39, between a specific telephone connection and data connection is established when the unique identifier for a specific data connection is stored in the data structure for a specific telephone connection, or when the unique identifier for a particular telephone connection is stored in the data structure of a specific data connection. In other words, the data structure representing a telephone connection can store a pointer that identifies a specific data connection, and the data structure representing a data network connection can store a pointer that identifies a telephone connection.

Figure 3:
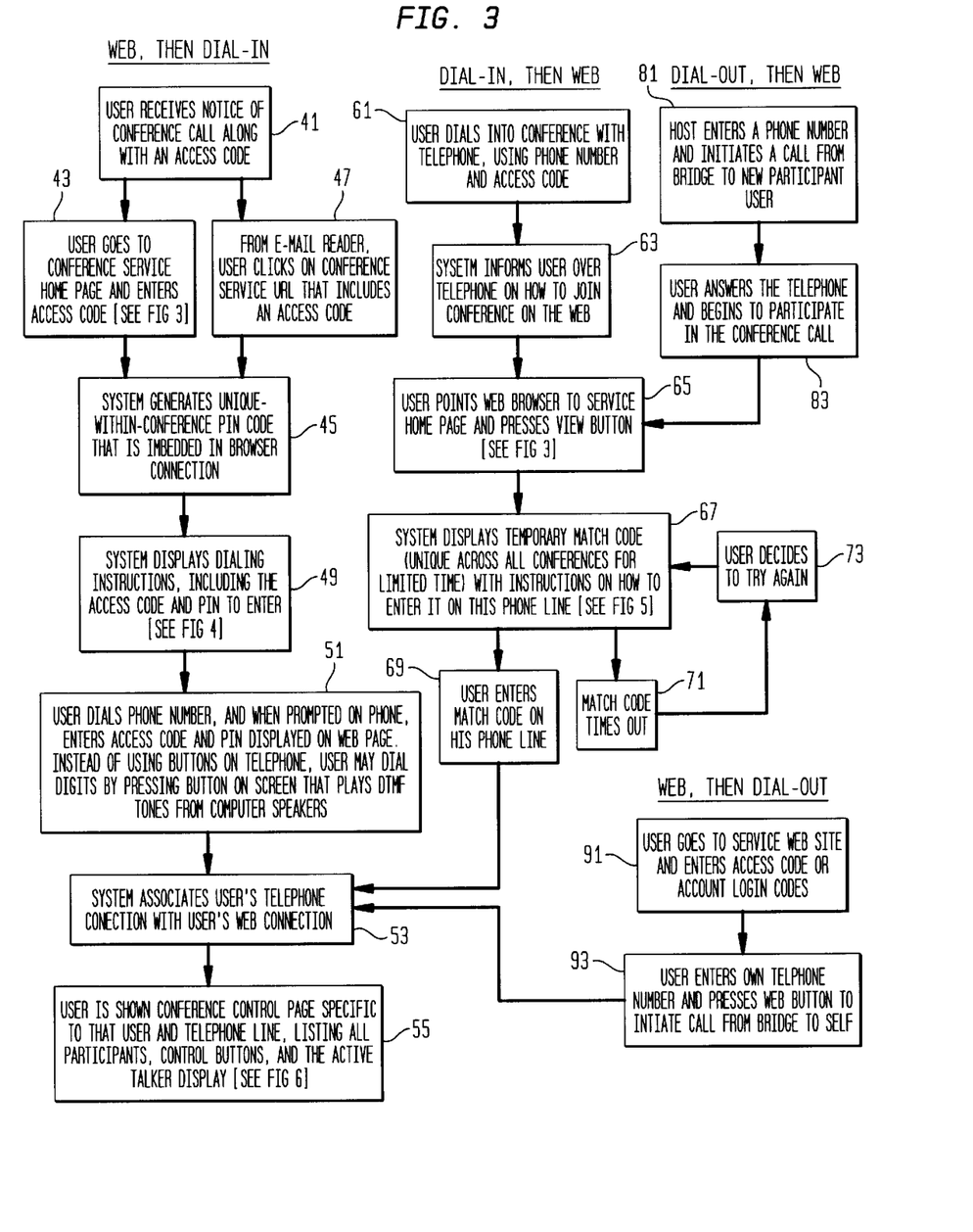
FIG. 3 is a flow chart illustrating four different scenarios for operationally associating data connections with conference call telephone connections in accordance with the invention.

Four different scenarios for operationally associating data connections with conference call telephone connections in accordance with the invention are illustrated by the flow chart in FIG. 3.

The first of these scenarios may be summarized as "web then dial-in." Rather than depend on pre-assigned personal identifiers, the method of this first scenario associates an Internet web page with a dial-in phone call operationally by dynamically generating unique participant codes at the time when participants join the conference. Participants go to the service provider's web site and enter a conference access code (which can be the same for all participants), or they click on a hyperlink that already includes a conference access code. In either alternative, a valid access code causes the conference system to generate a personal identification number (PIN) that is unique within the intended conference, and the system displays it on a web page assigned to the participant, along with instructions on the phone number to dial and how to enter the access code and PIN. Users may dial and enter the access code by hand, using the buttons on their telephones. As an alternative, the conference service can provide a button on a user's computer monitor screen that, when clicked on, plays the necessary DTMF (dual tone multi frequency) tones out of the computer's speakers. Instead of entering conference codes by hand, users may instead hold their telephone handsets near a computer speaker and allow their computer speaker to do the dialing for them.

After a user has dialed in and entered this access code and PIN, the user's web browser loads a conference control page for that specific telephone line, along with an active talker display which may take the form of that disclosed in the present inventors' above-identified application entitled "Active Talker Display for Web-Based Control of Conference Calls." This may be done in response to a user's mouse click, or may be done automatically by the system in response to dialing in by telephone.

The "web then dial-in" procedure is illustrated beginning with step 41 in FIG. 3. In step 41, a user receives notice of a conference call, along with an access code unique to that conference call. In step 43, a user follows step 41 by using his computer to access the conference service provider's Internet home page (see the video monitor screen shot shown in FIG. 3) and enters the access code. Step 43 is followed by step 45, in which the conference control system generates a unique-within-the conference PIN code that is imbedded in the browser connection.

Alternatively, the user may proceed from step 41 to a step 47, in which, from an electronic mail (e-mail) reader, the user clicks on a conference service URL (uniform resource locator) that includes an access code. The user then proceeds from step 47 to step 45.

Figure 5:
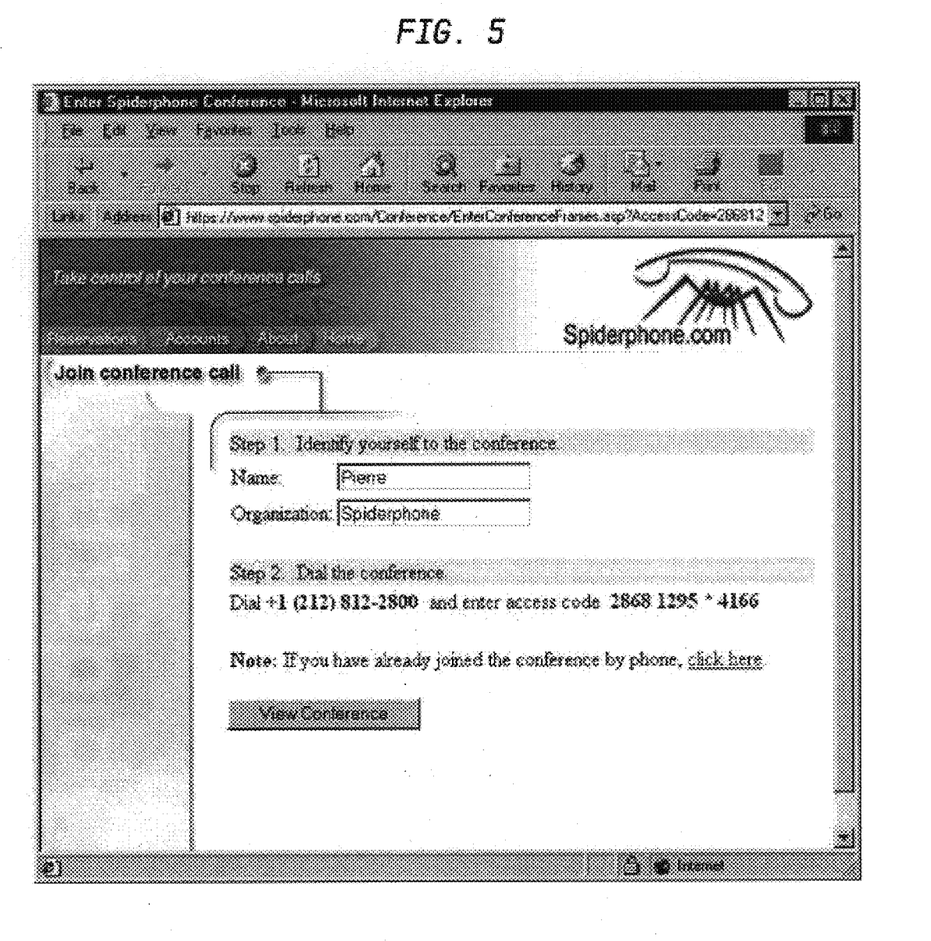
FIG. 5 is a video monitor display screen shot, in accordance with the invention, of a conference service provider web page initiating entry into a conference.

Following step 45, the illustrated method proceeds to step 49, in which the system displays dialing instructions, including the access code and the PIN to enter (see the video monitor screen shot illustrated in FIG. 5). The method then proceeds to step 51, in which the user dials a phone number of the conference call service provider. When prompted on his telephone, the user enters the access code and PIN displayed on the web page. Alternatively, instead of using buttons on his telephone set, the user may dial digits by using his computer mouse to click on buttons on his video monitor screen that play DTMF tones from computer speakers.

Figure 7:
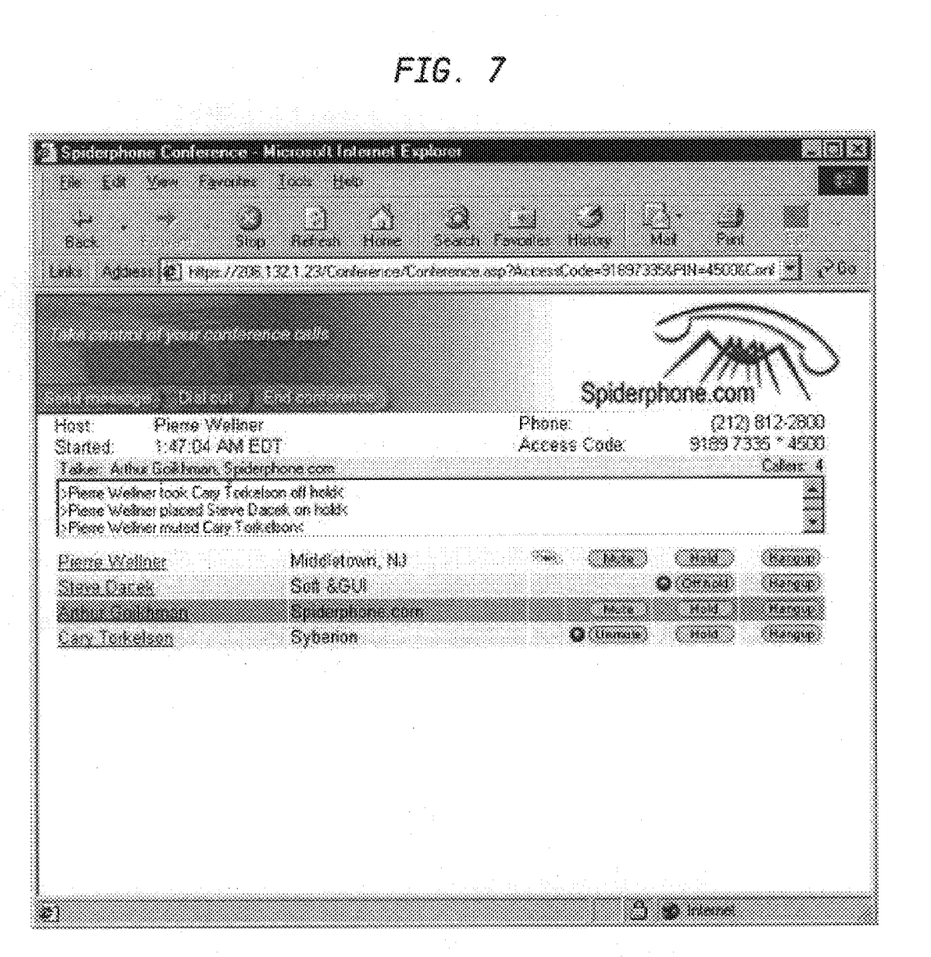
FIG. 7 is a video monitor display screen shot, in accordance with the invention, of a conference service provider web page specific to a user and telephone line.

Only following step 51 does the service provider's conference call system associate the user's telephone connection operationally with the user's web connection. Finally, the user is shown a conference control web page specific to that user and that user's telephone line, listing all participants, control buttons, and an active talker display (see the video monitor screen shot illustrated in FIG. 7).

The second scenario may be summarized as "dial-in, then web." After dialing into the bridge, participants are prompted for their access codes. If this access code does not include a PIN (as described above), then no web-port association is made at this time, but the participant is told that he or she can see more information about the call by going to the web site.

If the user then goes to the web site and clicks on the View button, the system generates a temporary match code. Unlike a PIN, which is only unique within a single conference and is valid for the entire duration of the conference, the match code is unique across all conferences, but is only valid for a brief period of time, such as a minute or so.

This match code is displayed on a web page to the user along with instructions on how to enter it into the user's telephone connection. For example, the user may be told to press the '*' key followed by the match code. When the user enters this match code on his telephone before the time expires, then the system has enough information to associate this telephone line operationally with the specific web connection, and the user can be shown the correct conference control page.

As an alternative, the temporary match code may take the form of a language password or phrase instead of digits. Such a match code may be spoken into the participant's telephone set using the participant's own voice, with the system using speech recognition technology for detection purposes.

Figure 4:
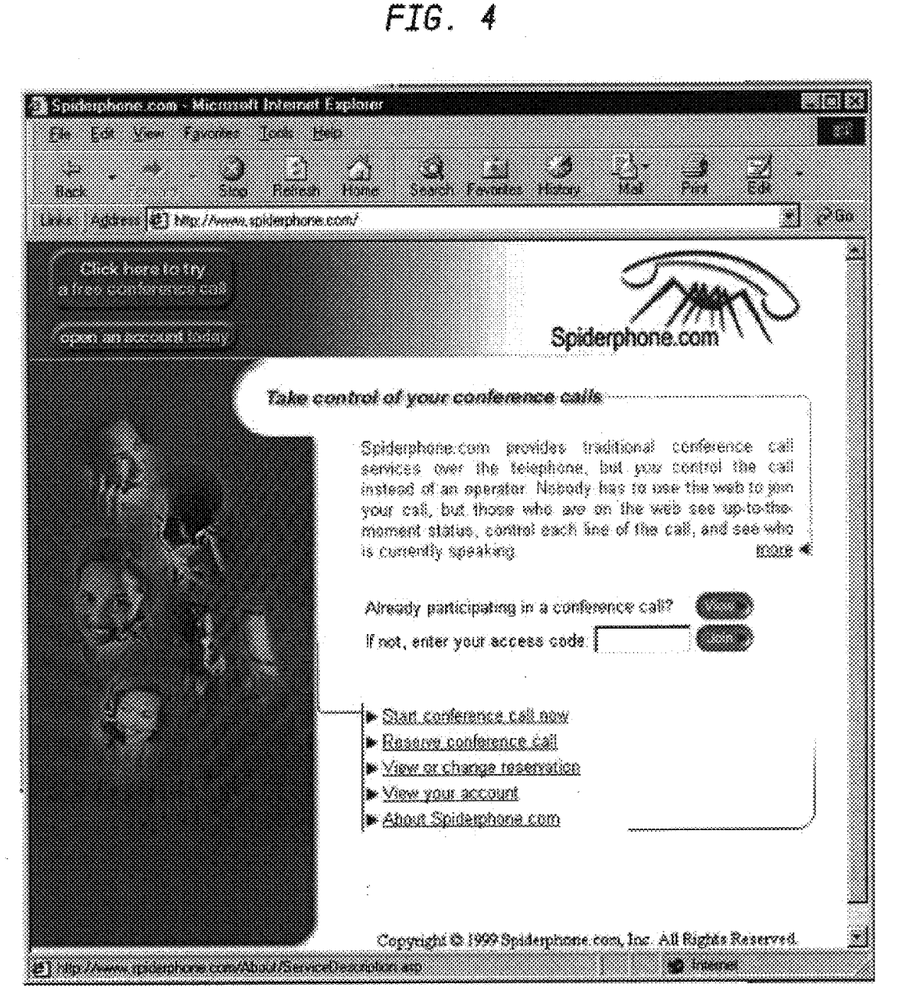
FIG. 4 is a video monitor display screen shot, in accordance with the invention, of a conference service provider world wide web home page.

In FIG. 3, this second scenario begins with step 61, in which the user dials into a conference with his telephone, using the service provider's telephone number and access code. Next, in step 63, the system informs the user over his telephone how to join the conference on the web. Then, in step 65, the user points his web browser to the service provider's home page and clicks on the View button (see the video monitor screen shot shown in FIG. 4).

Figure 6:
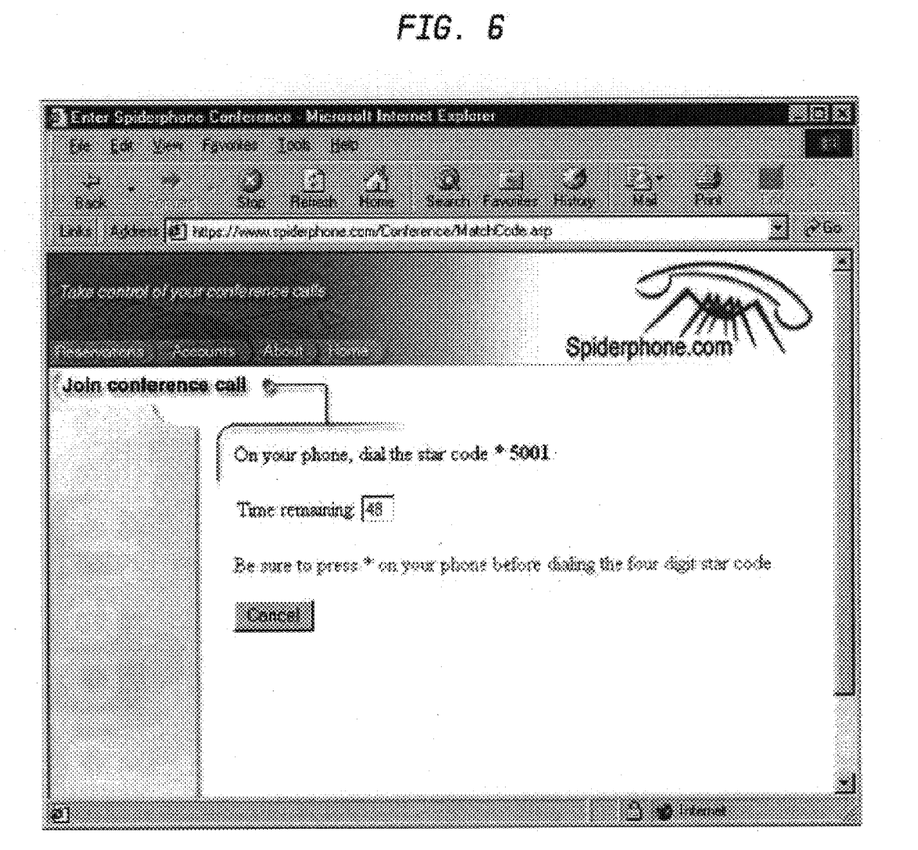
FIG. 6 is a video monitor display screen shot, in accordance with the invention, of a conference service provider web page displaying a temporary match code for entry into a conference.

Then, in step 67, the system displays a temporary match code, unique across all conferences for a limited period of time, with instructions on how to enter it on his telephone line (see By the video monitor screen shot shown in FIG. 6). Following step 67, the scenario moves to step 69, in which the user enters the match code on his telephone line within the appointed period of time. Should the user fail to do so, the scenario moves instead to step 71, in which the match code times out.

If the match code times out, as in step 71, the user may move to step 73, deciding to try again, whereupon he moves back to step 67.

Following step 69, in which the user successfully enters the match code within the appointed period of time, the scenario moves to step 53, in which the system associates the user's telephone connection operationally with the user's web connection. Finally, the user is shown a conference control page specific to that user and telephone line, listing all participants, control buttons and an active talker display (see the video monitor screen shot illustrated in FIG. 7).

The third scenario may be summarized as "dial-out, then web." On a dial-out leg, the participant receives a phone call that was initiated by a conference host. If the call is placed live from within the conference, then this participant will not necessarily find out about the web interface unless another participant mentions it, or if the participant presses certain keys on his phone. If the participant learns the URL and conference access code, however, then he or she may view the conference using the same steps as described in the dial-in then web scenario above. A disadvantage of this technique is that the dialed-out participant needs to receive a conference access code.

A preferred technique, which does not require the participant to obtain the conference access code, is to use a match code as described in the previous section. When joining the conference with a match code, the dialed-out user needs only to know the web site URL, where a Join button can be prominently displayed on the home page. When a user clicks on the Join button, the system generates a temporary match that is displayed on the user's web browser so that if the user enters the code on the telephone in time, then this user can be shown the conference control page.

In a blast-dial variant scenario, when multiple participants are dialed simultaneously, users receive a phone call from the conference with a recorded message that prompts them to press a tone to enter the conference. At the same time, this recorded message can also inform users of how to join the conference on the web (e.g. "To join this conference on the web, go to http://www.spiderphone.com and click on the 'Join' button").

FIG. 3 illustrates this third scenario, beginning with step 81, in which the conference call host enters a phone number and initiates a call from the conference bridge to a new participant user. In step 83, the user answers his telephone and begins to participate in the conference call by moving to step 65. In step 65, the user points his web browser to the service provider's home page and clicks on the View button (see the video monitor web shot illustrated in FIG. 4).

Following step 65, in step 67 the system displays a temporary match code, unique across all conferences for a limited period of time, with instructions on how to enter it on his telephone line (see the video monitor screen shot shown in FIG. 6). Following step 67, the scenario moves to step 69, in which the user enters the match code on his telephone line within the appointed period of time. Should the user fail to do so, the scenario moves instead to step 71, in which the match code times out.

If the match code times out, as in step 71, the user may move to step 73, deciding to try again, whereupon he moves back to step 67.

Following step 69, in which the user successfully enters the match code within the appointed period of time, the scenario moves to step 53, in which the system associates the user's telephone connection operationally with the user's web connection. Finally, the user is shown a conference control web page specific to that user and telephone line, listing all participants, control buttons and an active talker display (see the video monitor screen shot illustrated in FIG. 7).

The fourth scenario may be summarized as "web, then dial-out." In this scenario, a participant initiates the dial-out to himself from his own web browser. In this scenario, a participant goes to the web site and enters the access code or goes directly to a URL that already includes the access code. As before, a PIN is automatically generated, but as an alternative to dialing in, the participant has the option of entering a phone number to have the bridge call himself. After the call is completed, the participant can view the conference and active talker display.

FIG. 3 illustrates this scenario, beginning with step 91, where the user goes to the service web site and enters an access code or account login codes. Following step 91, the scenario goes to step 93, in which the user enters his own telephone number and clicks on a web page button to initiate a call from the conference bridge to him, either immediately or scheduled for a later time after the call has begun and at least one other participant has joined the call. In step 53, the system then associates the user's telephone connection operationally with the user's web connection. Finally, in step 55, the user is shown a conference control web page specific to that user and his telephone line, listing all participants, control buttons, and an active talker display.

In all scenarios, an alternative is to dynamically assign a PIN at the time when a conference reservation is made, instead of at the time when people are joining the active conference. In this alternative, the steps that participants take to associate their phone and web connections remain similar, but the system has the ability to provide each individual with a PIN at the same time as the conference access code. This can be done if all participants receive distinct messages informing them of the conference call, and it makes the dial-in then web scenario simpler because the access code and PIN can be entered at the same time.

It is to be understood that the specific implementations of the invention which have been described are illustrative numerous other arrangements and modifications may be readily devised by those skilled in the art without departing from the spirit and scope of the invention.

What is claimed is:

1. A method of operationally associating a participant's telephone connection to a conference call system with a data connection from said participant's computer screen to said conference call system, said conference call system establishing voice connections between itself and multiple conference call participants, said method comprising the steps of:

generating a unique temporary code when a data connection is established between said participant and said conference call system;

displaying said code over said data connection to said participant on that participant's computer screen; and instructing said participant to enter said code over his telephone connection to the conference call system.

2. The method of claim 1 in which said temporary code is a PIN (personal identification number) code unique within an individual conference call.

3. The method of claim 1 in which said temporary code is a match code unique across all active conferences and valid only for a limited period of time.

4. The method of claim 1 in which said temporary code is a language password or phrase which may be spoken into said participant's telephone and recognized by said system using speech recognition technology.

5. The method of claim 1 in which the operational association between said participant's telephone and data connections is accomplished by the steps of:

establishing a data connection between said participant's computer screen and the conference system;

receiving a conference access code from said participant for a specific conference call;

generating a PIN (personal identification number) code unique to the specific conference;

sending said PIN code over said participant's data connection to said participant's computer;

displaying dialing instructions on said participant's computer screen explaining to said participant how to enter the conference;

dialing into the conference call according to said displayed dialing instructions;

establishing operational association between said first participant's data and telephone connections; and displaying a conference control web page specific to said participant and said participant's telephone connection.

6. The method of claim 1 in which the operational association between said participant's telephone and data connections is accomplished by the steps of:

dialing said participant's telephone into the conference call using a designated telephone number and conference access code, said system allowing said participant's telephone line into the conference call with no operationally associated data connection;

if no personal identification number (PIN) is entered, said system informing said participant with a voice prompt that he can use his computer to see more detailed information about the conference;

said system allowing said participant from the conference web site to click on a specific button in order to view the conference call;

after said participant clicks on a view button, said system generating a temporary match code unique across all conferences for a limited period of time and displaying instructions to said participant on how to use this match code; and after said participant enters said match code on his telephone line within said limited period of time, then making an operational association between said participant's data connection and said participant's telephone connection and displaying a conference control web page.

7. The method of claim 1 in which the operational association between said participant's telephone and data connections is accomplished by the steps of:

entering a telephone number into the system and commanding the conference call system to dial out to said participant's telephone;

instructing said participant from the conference web site to click on a specific button in order to view the conference call;

generating a temporary match code unique across all conferences for a limited period of time and displaying instructions over said participant's data connection on how to use said match code; and after said participant enters said match code on his telephone line in time, then making an operational association between said participant's data connection and said participant's telephone connection and displaying a conference control web page.

8. The method of claim 1 in which the operational association between said participant's telephone and data connections is accomplished by the steps of:

establishing a data connection between said participant's computer and said conference call system;

entering a conference access code to authenticate said participant with the system and identify which conference call said participant is attempting to join;

entering said participant's own telephone number and commanding the conference call to dial out to his telephone;

after said participant answers his telephone and confirms that he wishes to enter the conference, operationally associating said participant's data connection with the telephone connection said participant initiated; and showing said participant his conference control web page.

9. The method of claim 8 in which upon entering said participant's telephone number, if the conference is not yet scheduled to begin, commanding the conference call to dial out to said participant's telephone after at least one other participant has joined the conference.

* * * * *